United States Patent
Hsiao et al.

(10) Patent No.: US 6,859,347 B2
(45) Date of Patent: Feb. 22, 2005

(54) MAGNETIC TRANSDUCER WITH ELECTRICALLY CONDUCTIVE SHIELD FOR REDUCING ELECTROMAGNETIC INTERFERENCE

(75) Inventors: Richard Hsiao, San Jose, CA (US); Klaas Berend Klaassen, San Jose, CA (US); Edward Hing Pong Lee, San Jose, CA (US); Timothy J. Moran, San Jose, CA (US); Vladimir Nikitin, San Jose, CA (US); Michael Paul Salo, San Jose, CA (US); Samuel Wei-San Yuan, Saratoga, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 536 days.

(21) Appl. No.: 09/756,377

(22) Filed: Jan. 4, 2001

(65) Prior Publication Data

US 2002/0085316 A1 Jul. 4, 2002

(51) Int. Cl.[7] ................................................ G11B 5/39
(52) U.S. Cl. ...................................................... 360/319
(58) Field of Search ................................ 360/313, 317, 360/319, 323, 126

(56) References Cited

U.S. PATENT DOCUMENTS

| 5,323,285 A | 6/1994 | Smith |
| 5,557,492 A | 9/1996 | Gill |
| 5,754,369 A | 5/1998 | Balakrishnan |
| 5,898,548 A | 4/1999 | Dill et al. |
| 5,923,502 A | 7/1999 | Christensen et al. |
| 6,160,688 A | * 12/2000 | Okumura .................... 360/323 |
| 6,246,553 B1 | * 6/2001 | Biskeborn ................... 360/323 |
| 6,473,277 B1 | * 10/2002 | Gill ............................. 360/319 |
| 6,477,008 B1 | * 11/2002 | Chang et al. ............... 360/128 |
| 6,496,335 B2 | * 12/2002 | Gill ............................. 360/319 |
| 6,631,056 B1 | * 10/2003 | Asatani et al. ............. 360/323 |
| 6,643,104 B2 | * 11/2003 | Shimazawa ................ 360/319 |

FOREIGN PATENT DOCUMENTS

| EP | 0457278 | | 11/1991 |
| JP | 8-36717 | * | 2/1996 |
| JP | 11-296818 | * | 10/1999 |
| JP | 2001-236614 | * | 8/2001 |

* cited by examiner

Primary Examiner—David L. Ometz
(74) Attorney, Agent, or Firm—G. Marlin Knight

(57) ABSTRACT

A magnetic transducer including an electrically conductive shield (ECS) which is disposed between the substrate and first magnetic shield is described. The ECS is preferably embedded in an insulating undercoat layer. The ECS is preferably electrically isolated from the magnetic sensor element and is externally connected to a ground available in the disk drive through the arm electronics. Two alternative ways for connecting the ECS to a ground are described. In one embodiment which is only effective with single-ended input type arm electronics, the ECS is connected to a ground through a via to a lead pad for the read head which is connected to the ground of the arm electronics. In a second and more preferred embodiment a separate lead pad is included on the head to allow the ECS to be connected to electronic or case ground when the head is installed in the arm. The extent of the ECS should be sufficiently large to cover the read head portion of the transducer, i.e., from the edge of the first magnetic shield to the outer edges of the read contact pads, but should preferably not cover the write head pads.

16 Claims, 5 Drawing Sheets

MAGNETIC TRANSDUCER WITH ELECTRICALLY CONDUCTIVE SHIELD FOR REDUCING ELECTROMAGNETIC INTERFERENCE

FIELD OF THE INVENTION

The invention relates to the field of magnetic transducers (heads) and more particularly to heads with shields which reduce externally generated electromagnetic interference.

BACKGROUND OF THE INVENTION

Demands for increased areal recording density in magnetic disk drives in turn require read heads with a higher signal-to-noise ratio (SNR). Demands for a higher SNR increase the need to shield the sensor element from external signals such as RF interference or noise.

A typical prior art head and disk system is illustrated in FIG. 1. In operation the head 10 is supported by a suspension 13 as it flies above the disk 16. The magnetic transducer, usually called a "head," is composed of elements that perform the task of writing magnetic transitions (the write head 23) and reading the magnetic transitions (the read head 12). The electrical signals to and from the read and write heads 12, 23 travel along conductive paths 14 which are attached to or embedded in the suspension arm. Typically there are two electrical contact pads each for the read and write heads. Wires or leads are connected to these pads and routed in the suspension 13 to the arm electronics (not shown). The disk 16 is attached to a spindle 18 which is driven by a spindle motor 24 to rotate the disk. The disk 16 comprises a substrate 26 on which a plurality of thin films 21 are deposited. The thin films include ferromagnetic material in which the write head records the magnetic transitions in which information is encoded.

The layers comprising the read head 12 of the prior art head 10 are further illustrated in FIG. 2. Only selected layers have been illustrated in the figure for clarity. The undercoat 11 is deposited on substrate 15. The sensor element 32, which can be a Giant Magnetoresistive (GMR) element or the like, is surrounded on two sides in a sandwich fashion by two magnetic shields 17, 19 which are typically called S1 and S2 respectively. A primary function of S1 and S2 is to shield the sensor element (GMR, etc.) from adjacent magnetic signals on the disk drive surface and therefore, to allow the sensor to respond only to the signal from a very small area of magnetic material on the disk and thereby reduce the bit size. The shields also protect the sensor element from the magnetic field generated by the write head.

Variations on the basic S1 and S2 shielding include magnetically connecting the shields through a low reluctance path as is described in U.S. Pat. No. 5,923,502 to Christensen, et al.

U.S. Pat. No. 5,754,369 to Balakrishnan provides electrostatic shielding during reading by grounding the write traces in the suspension which are routed proximate to the read traces.

A magnetic tunnel junction (MJT) magnetoresistive head is described in U.S. Pat. No. 5,898,548 to Dill, et al., which has electrically conducting spacer layers at the top and bottom of the MJT. These electrically conducting spacer layers lie between the shields and are used to connect the MJT to the shields.

A model of the equivalent circuit of the prior art read head interface with the disk shows three largest elements of capacitive coupling: S1 to disk; S2 to disk and substrate to disk. The value of the total capacitance is inversely proportional to the distance between the disk and the head elements and directly proportional to the areas of the conductive elements. The thin films on the disk are conductive and, therefore, may act as an antenna that injects electromagnetic interference into the head. Depending on the specific values of the capacitance and other components in the circuit, strong external RF signals from sources outside of the drive and RF signals generated by the drive electronics can be picked up by the read head. The RF noise coupled from the disk by the mechanism described above, is further capacitively coupled into the sensor (e.g. GMR) element and the lead structure. The coupling occurs through multiple paths, with the largest contribution coming from capacitive coupling between the substrate 15 and the sensor leads (not shown), as well as, through the path from the substrate to S1 and the sensor leads. This noise is indistinguishable from the sensor signal, and therefore, adversely affects the SNR.

SUMMARY OF THE INVENTION

A head according to the invention includes an electrically conductive shield (ECS) which is disposed between the substrate and first magnetic shield (S1). The ECS is preferably embedded in an insulating undercoat layer. The ECS is preferably electrically isolated from the MR or GMR sensor element and, when the head is installed in the arm, externally connected to a ground available in the arm which can be an electronic signal ground or case ground. Two alternative methods for connecting the ECS to a ground are described. In one embodiment, which is only effective with a single-ended input type of arm electronics, the ECS is connected to the ground through a via to a lead pad for the read head which is connected to the ground of the arm electronics. In this embodiment the ECS is electrically shorted to one side of the sensor element. In a second and more preferred embodiment a separate pad is included on the head to allow the ECS to be connected to a ground independent of the sensor element when the head is installed in the arm.

The extent of the ECS should be sufficiently large to cover the read head portion of the transducer, i.e., from S1 to the outer edges of the read lead pads, but should not be so large that it significantly contributes to stray capacitance in the write head. The ECS may or may not extend to the air bearing surface, but if the ECS is exposed at the air bearing surface it should be made from a noncorrosive material.

DETAILED DESCRIPTION OF THE INVENTION AND THE PREFERRED EMBODIMENTS

Figure 1:
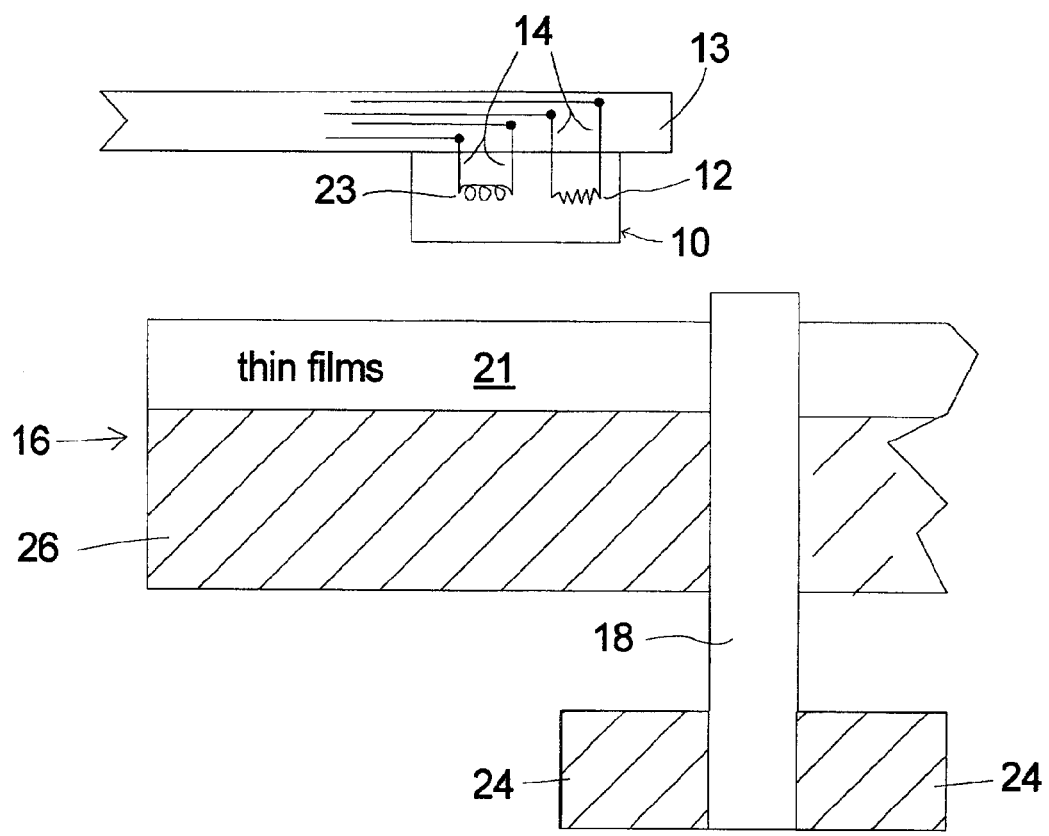
FIG. 1 is an illustration of the prior art showing the relationships between the head and associated components in a disk drive.
Figure 2:
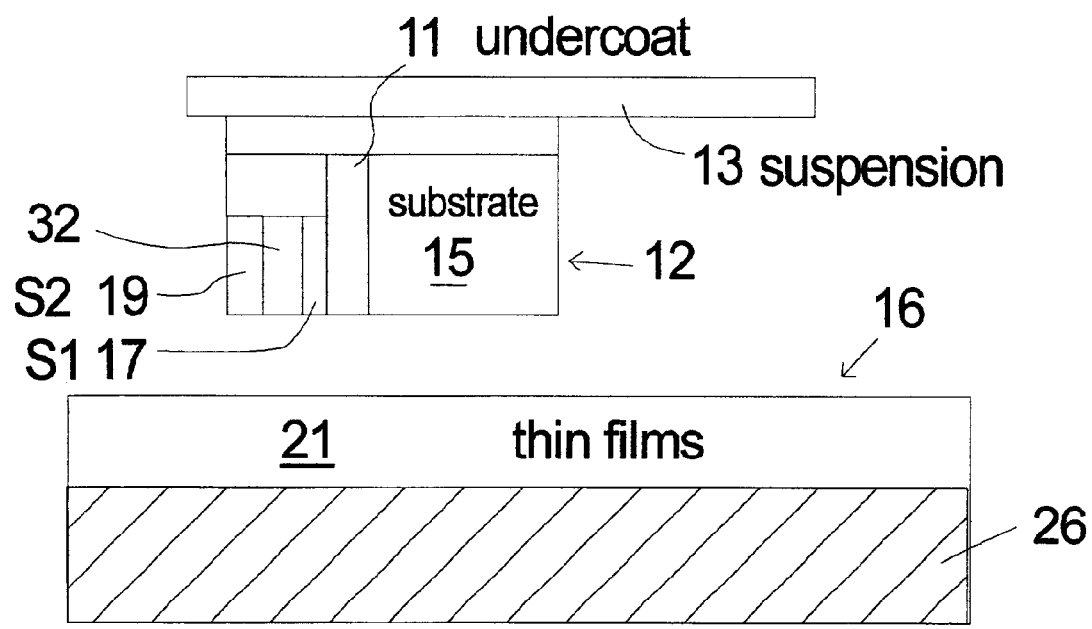
FIG. 2 is an illustration of a section of a prior art head showing selected layers comprising the read head.
Figure 3:
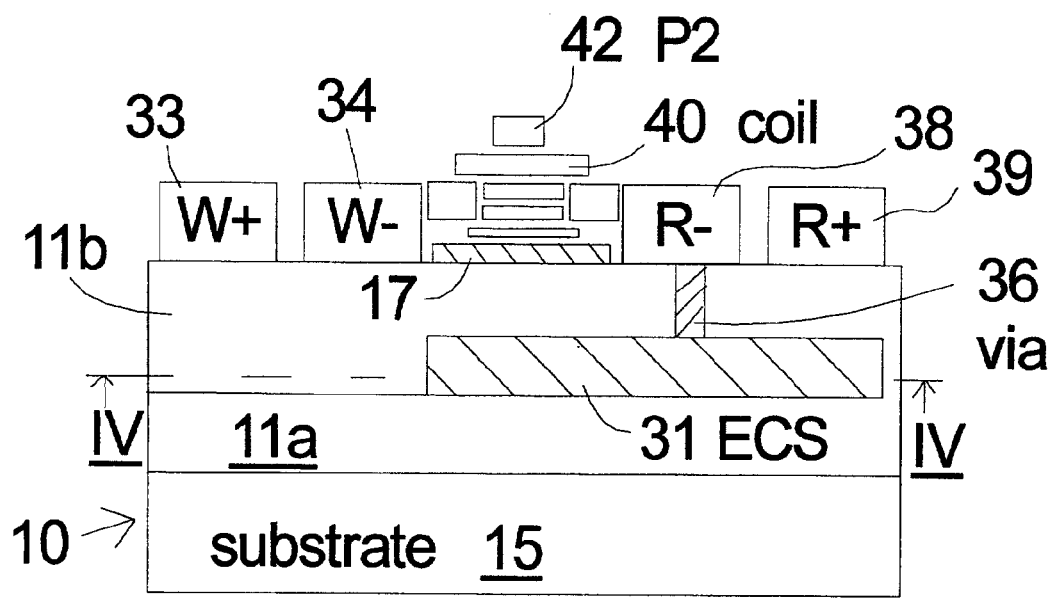
FIG. 3 is an illustration of a section, parallel to the air bearing surface of a head with an embodiment of the invention.

A first embodiment of the invention in a "merged" GMR head 10 is illustrated in FIG. 3 in a section view taken parallel to the air bearing surface. This embodiment is only useful in drives having a single-ended input type of amplifier in the arm electronics, since it requires that one of the leads for the read head be connected to ground. With the exceptions described below, the layers of the head 10 are built up in the conventional order and using conventional deposition techniques starting with substrate 15 on which an initial layer of undercoat material 11a is deposited. The undercoat material serves as electrical insulation and may be, for example, alumina. The layer of electrically conductive material, preferably copper or a copper alloy in this embodiment, for the electrically conductive shield (ECS) 31 is deposited and patterned using conventional techniques such as those used to deposit and pattern conventional components in the head 10 such as the coil 40 and the connection pads such as the write pads 33, 34 and the read pads 38, 39.

In the preferred embodiments, the ECS 31 is kept away from the write pads 33, 34. This avoids the parasitic capacitance that would otherwise be introduced into the write circuitry with deleterious effects. The write signal would be partially shunted to ground through the ECS 31 if significant parasitic capacitance were allowed to form. On the other hand, the write pads 33, 34 are already grounded by the write driver of the arm electronics (not shown) during reading and, therefore, do not contribute to the noise pick-up. Thus, there is no benefit to be gained from placing the ECS 31 over the write pads 33, 34 and degraded performance of the write head would result.

The ECS 31 in the embodiment of FIG. 3 extends from approximately the edge of S1 17, so that the write pads 33, 34 will not have the ECS 31 under them. The ECS 31 extends to the outer edge of the outermost read pad 39. Once the extent of the ECS 31 is set, a second layer of the undercoat material 11b is deposited over the exposed initial layer 11a of the undercoat and the ECS 31. At the point in the process when the read pad 38 is to be deposited a via 36 preferably should already be formed in the undercoat layer 11b under the read pad 38. The via 36 allows the electrically conductive material used for the read pad 38 to fill the via 36 and to provide an electrical connection from the ECS 31 to the read pad 38. When the head 10 is ultimately installed in a suspension the read pad 38 will be connected to the ground in the arm electronics which are not shown in this view. The subsequent deposition process for the other elements of the head up to the coil 40 and P2 42, continues according to the prior art. The conductive material is also kept back from the air bearing surface in this embodiment.

Copper is the preferred material for the ECS 31 when the ECS 31 does not extend to the ABS 22, but other conductive materials can be used. Copper is already used in prior art heads for coils and lead pads, so conventional techniques can be used to deposit and pattern the copper for the ECS 31. Other metals such as gold, silver, chromium, aluminum, etc. can also be conveniently used.

The thickness of the ECS 31 is not critical. Since the ECS 31 does not affect the spacing of any other components in the head, the only constraints are that it be thick enough to be sufficiently conductive to perform adequate shielding and that it not be so thick as to increase the size of the head or degrade planarization. Adequate conductivity can be determined empirically for the particular head design in which the ECS 31 is being used. A thickness on the order of 1,000 Angstroms is a good estimate for heads in common use as of the writing of the application.

Figure 4:
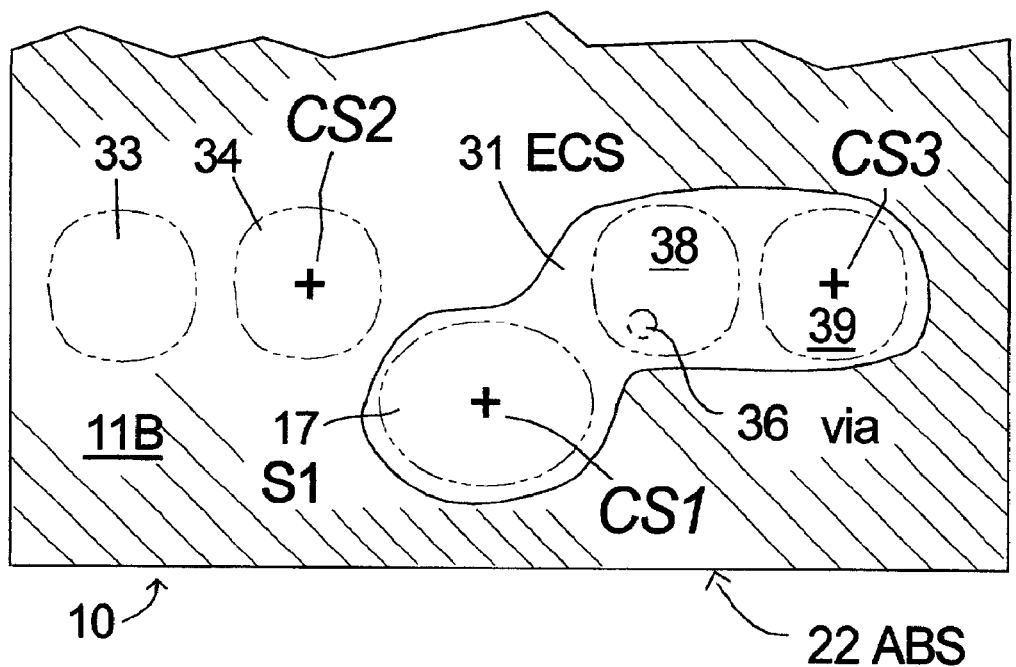
FIG. 4 is an illustration of a section, perpendicular to the air bearing surface of a head with a first embodiment of the invention.

FIG. 4 is an illustration of a section of a head 10 through the ECS 31, perpendicular to the air bearing surface (ABS) 22 of the head according to the first embodiment of the invention as shown in FIG. 3. The section line IV is indicated in FIG. 3 with a broken line and arrows pointing in the direction of the view. When the ECS 31 is deposited, the majority of the components of the head will not have been deposited. The ECS 31 preferably does not extend over the entire layer. In this embodiment the ECS 31 is formed in a continuous film to cover the area where S1 17 and the read pads 38, 39 will subsequently be formed. The ECS 31 will not extent over the area where the write pads 33, 34 will subsequently be formed. In the section taken for FIG. 4, only the underlayer 11B and the ECS 31 are present. Therefore, the write pads 33, 34; S1 17; the via 36 and the read pads 38, 39 are shown in phantom indicating that these elements are present further into the head. The ECS 31 extends over the via 36 which electrically connects the ECS 31 to the read pad 38.

The labels CS1, CS2 and CS3 in FIG. 4 indicate lines perpendicular to the plane of the section along which the layers will be described in order to define the coverage of the ECS 31. The CS1 line passes through the approximate center of the S1 magnetic shield 17. A hypothetical cylindrical core (not shown) centered around the CS1 line with a radius selected so that the core does not extend outside of S1 17 would also not extend outside of the ECS 31.

Thus, if such a cylindrical core sample of the head embodiment of FIG. 4 were taken along the CS1 line, the features encountered in sequence would be the substrate 15; the first undercoat layer 11a; the electrically conductive shield 31; the second undercoat layer 11b and the magnetic shield S1 17. From S1 17 onward the layers are identical to the prior art and can be any of the variations known in the prior art. Thus, viewed along this core, the ECS 31 substantially covers S1 17.

The CS2 line is approximately centered in the write lead pad 34. In a cylindrical core sample (also not shown) of the head 10 embodiment of FIG. 4 taken along the CS2 line selected not to extend beyond the boundary of the write lead pad 34, the features encountered in sequence would be the substrate 15; the first undercoat layer 11a; the second undercoat layer 11b and the write pad 34. Thus, viewed along this core, the ECS 31 does not cover the write pad 34.

In a similar core sample of the head 10 embodiment of FIG. 4 taken along the CS3 line, which is approximately centered in the read lead pad 39, and selected not to extend beyond the boundary of the pad 39, the features encountered in sequence would be the substrate 15; the first undercoat layer 11a; the ECS 31; the second undercoat layer 11b and the read pad 39. Thus, viewed along this core, the ECS 31 covers the read pad 39.

Figure 5:
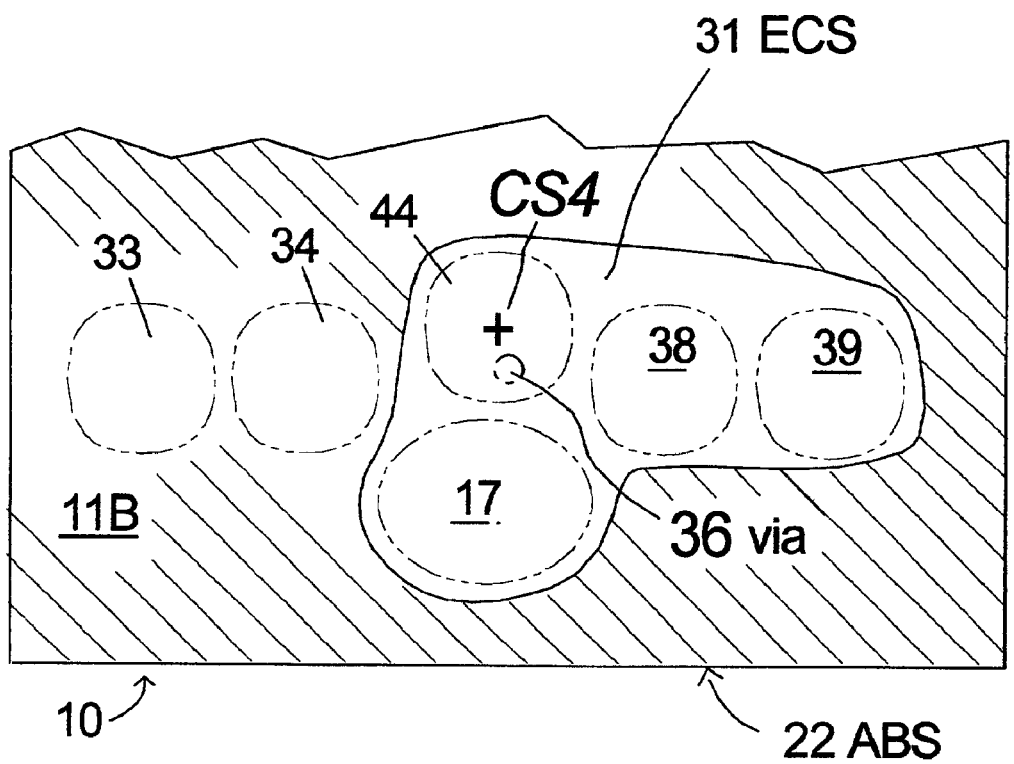
FIG. 5 is an illustration of a section, perpendicular to the air bearing surface of a head with a second embodiment of the invention.

FIG. 5, similarly to FIG. 4, is an illustration of a section of a head 10 through the ECS 31, perpendicular to the air bearing surface of the head 10 according to a second embodiment of the invention. This embodiment is useful in drives having either single-ended or differential amplifiers in the arm electronics (not shown), since it utilizes a dedicated lead pad 44 which is connected to a ground independent of the read pads 38, 39. In this embodiment the ECS 31 encompasses the areas of the first embodiment of the ECS 31 and includes an additional grounding pad 44 which is formed between the read pad 38 and write pad 34 and along a midline through the coil 40 (FIG. 3). In this embodiment the via 36 connects the ECS 31 to the grounding pad 44 and none of the other contact pads 33, 34, 38, 39 are electrically connected to the ECS 31.

Figure 6:
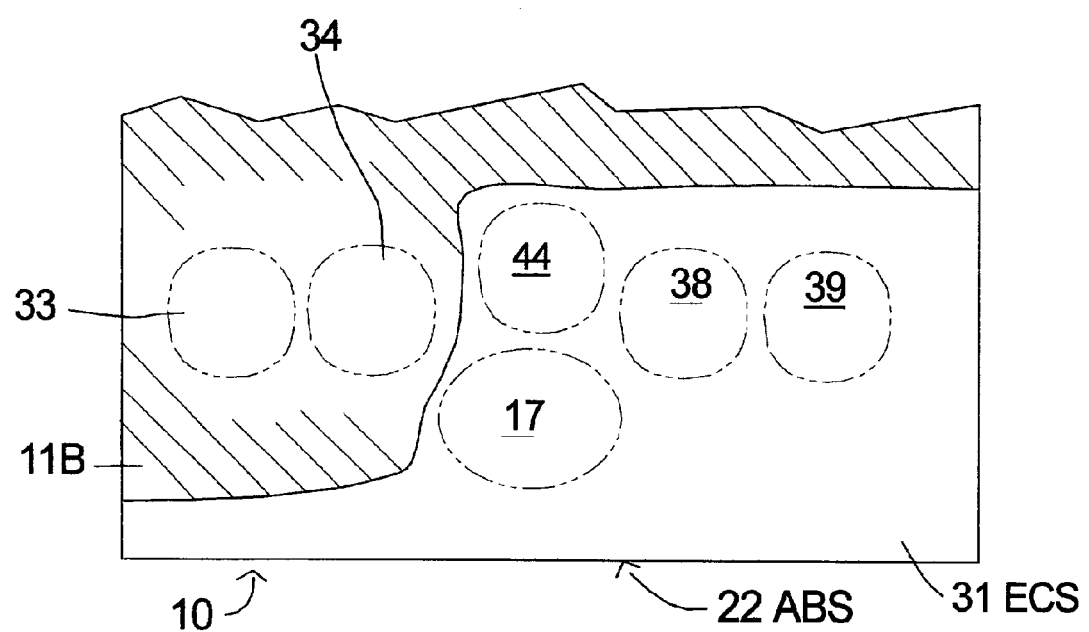
FIG. 6 is an illustration of a section, perpendicular to the air bearing surface of a head with a third embodiment of the invention

The label CS4 in FIG. 5 indicates a line perpendicular to the plane of the section, i.e. along a line parallel to the ABS 22. The CS4 line passes through the approximate center of the ground pad 44. A cylindrical core sample (not shown) centered around the CS4 line with a radius selected so that the core does not extend outside of the ground pad would also not extend outside of the ECS 31. The features encountered in the core sample in sequence would be the substrate 15; the first undercoat layer 11a; the ECS 31; the second undercoat layer 11b and the ground pad 44. Thus, viewed along this core, the ECS 31 covers the ground pad 44. FIG. 6 is an illustration of a section, perpendicular to the air bearing surface of a head 10 according to a third embodiment of the invention. In this embodiment the ECS 31 covers a larger area than in the previous two embodiments because it extends to the air bearing surface. The ECS 31 in this case extends to cover substantially all of the surface in the layer except for the write pads 33, 34.

Copper is the preferred material for the ECS 31 when the ECS 31 does not extend to the ABS 22, but other conductive materials can be used. Copper is already used in prior art heads for coils and pad, so conventional techniques can be used to deposit and pattern the copper for the ECS 31. Other metals such as gold, silver, chromium, aluminum, etc. can also be conveniently used.

The thickness of the ECS 31 is not critical. Since the ECS 31 does not affect the spacing of any other components in the head, the only constraints are that it be thick enough to be sufficiently conductive to perform adequate shielding and that it not be so thick as to increase the size of the head or degrade planarization. Adequate conductivity can be determined empirically for the particular head design in which the ECS 31 is being used. A thickness on the order of 1,000 Angstroms is a good estimate for heads in common use as of the writing of the application.

Although the embodiments of the invention have been described in a GMR merged head environment, the ECS 31 as described herein is not limited to this application. Those skilled in the art will recognize that the ECS 31 of the invention may be used in magnetic transducers regardless of the type of sensor element used.

What is claimed is:

1. A transducer for reading magnetic transitions from a moving magnetic material comprising:
    an air bearing surface oriented in a first plane;
    a magnetic sensor;
    a first magnetic shield disposed along a second plane, the second plane being orthogonal to the first plane, the first magnetic shield having an area in the second plane and extending to the air-bearing surface;
    a second magnetic shield extending to the air-bearing surface;
    an electrically conductive shield formed in a third plane which is parallel to the second plane, the electrically conductive shield being electrically isolated from the first and second magnetic shields, the third plane being disposed so that the first magnetic shield is disposed between the electrically conductive shield and the magnetic sensor; and
    a first contact pad of conductive material in electrical contact with the electrically conductive shield and providing an external electrical connection to the electrically conductive shield.

2. The transducer of claim 1 wherein the first contact pad is disposed on a surface of the transducer with a planar surface parallel to the third plane, the first contact pad overlapping the electrically conductive shield, the transducer further comprising a via electrically connecting the electrically conductive shield to the first contact pad in an overlapping area.

3. The transducer of claim 1 further comprising a second contact pad of conductive material electrically insulated from the electrically conductive shield and in electrical contact with the magnetic sensor; and wherein the second contact pad is disposed with a planar surface parallel to the third plane, the electrically conductive shield extending to cover the first magnetic shield, the first contact pad and the second contact pad.

4. The transducer of claim 3 further comprising a write head and third and fourth contact pads in electrical contact with the write head; wherein the third and fourth contact pads are disposed with at least one planar surface parallel to the third plane and are offset from the first and second contact pads, and third and fourth contact pads are disposed beyond an outer extent of the electrically conductive shield.

5. The transducer of claim 4 further comprising a fifth contact pad in electrical contact with the magnetic sensor and electrically isolated from the electrically conductive shield and wherein the electrically conductive shield extends to cover the fifth contact pad.

6. The transducer of claim 4 wherein the electrically conductive shield extends to the air bearing surface and comprises a noncorrosive material.

7. The transducer of claim 4 wherein the electrically conductive shield is copper or a copper alloy.

8. A transducer including a write head and a read head for reading magnetic transitions from a moving magnetic material comprising a plurality of thin film layers disposed generally in parallel planes, the layers along a first cylindrical core orthogonal to the parallel planes comprising:
    a substrate;
    a first undercoat layer of electrically insulating material;
    an electrically conductive shield which is electrically connected to a first lead pad on an external surface of the transducer;
    a second undercoat layer of electrically insulating material; and
    a magnetic shield for a magnetic sensor, the magnetic shield being electrically insulated from the electrically conductive shield and overlapping the magnetic shield in an area orthogonal to the air bearing surface; and
    the layers along a second core orthogonal to the parallel planes comprising:
    the substrate;
    the first undercoat layer followed by the second undercoat layer, the first and second undercoat layers being contiguous; and
    a second lead pad electrically connected to the write head;
    whereby the electrically conductive shield does not extend to overlap the second lead pad in the second core.

9. The transducer of claim 8 wherein the layers along a third core orthogonal to the parallel planes comprise:
    the substrate;
    the first undercoat layer;
    the electrically conductive shield;

the second undercoat layer; and a third lead pad electrically connected to the magnetic sensor.

10. The transducer of claim 9 wherein the electrically conductive shield is composed of copper or a copper alloy, and the first and second undercoat layers are alumina.

11. A disk drive comprising:

a disk having a thin film of ferromagnetic material on a planar surface of the disk;

a spindle rotatably supporting the disk;

an arm with a suspension supporting a magnetic transducer having an air bearing surface over the planar surface of the disk, the arm including a differential amplifier; and the magnetic transducer including:

a read head, first and second lead pads connected to the read head, a write head, third and fourth lead pads connected to the write head, and a magnetic shield; and an electrically conductive shield layer in electrical contact with a fifth lead pad, the fifth lead pad being connected through the arm to a ground and being electrically isolated from the first, second, third and fourth lead pads, the first and second lead pads for the read head being electrically connected to the differential amplifier;

the electrically conductive shield layer extending along a first plane orthogonal to the air bearing surface, the first, second, third and fourth lead pads and the magnetic shield being disposed in a volume bounded by second and third planes which are perpendicular to a plane of the air bearing surface, the first plane being outside of the volume bounded by the second and third planes, the electrically conductive shield having an extent which intersects perpendicular lines from planar surfaces of the magnetic shield and the first and second lead pads for the read head, and does not intersect perpendicular lines from planar surfaces of the third and fourth lead pads for the write head.

12. The disk drive of claim 11 wherein the ground is a signal ground or a case ground.

13. A method of making a transducer comprising the steps of:

depositing a layer of conductive material for an electrically conducting shield having a first extent;

depositing a layer of electrically insulating material over the electrically conducting shield;

forming a via at a first location in the layer of electrically insulating material;

forming a magnetic shield of ferromagnetic material within the first extent and not over the first location of the via;

depositing electrically conductive material in the via and to form a first lead pad in electrical contact with the electrically conducting shield; and depositing electrically conductive material to form second and third lead pads connected to a write head, the second and third lead pads being formed outside of the first extent.

14. The method of claim 13 wherein the electrically insulating material is alumina and the electrically conductive material is copper or a copper alloy.

15. A transducer fabricated by a method comprising the steps of:

depositing a layer of conductive material for an electrically conducting shield having a first extent;

depositing a layer of electrically insulating material over the electrically conducting shield;

forming a via at a first location in the layer of electrically insulating material;

forming a magnetic shield of ferromagnetic material within the first extent and not over the first location of the via;

depositing electrically conductive material in the via and to form a first lead pad in electrical contact with the electrically conducting shield; and depositing electrically conductive material to form second and third lead pads connected to a write head, the second and third lead pads being formed outside of the first extent.

16. The transducer of claim 15 wherein the electrically insulating material is alumina and the electrically conductive material is copper or a copper alloy.

* * * * *